(12) United States Patent
Lin et al.

(10) Patent No.: US 12,391,101 B1
(45) Date of Patent: Aug. 19, 2025

(54) CAR COVER PLATE, FRAME CONNECTION STRUCTURE AND PICKUP TRUCK

(71) Applicant: ZHEJIANG SURPASS AUTO PARTS CO., LTD., Wenzhou (CN)

(72) Inventors: Yi Lin, Wenzhou (CN); Lei Lin, Wenzhou (CN)

(73) Assignee: ZHEJIANG SURPASS AUTO PARTS CO., LTD., Wenzhou (CN)

( * ) Notice: Subject to any disclaimer, the term of this patent is extended or adjusted under 35 U.S.C. 154(b) by 0 days.

(21) Appl. No.: 19/076,238

(22) Filed: Mar. 11, 2025

Related U.S. Application Data

(63) Continuation of application No. 19/018,071, filed on Jan. 13, 2025.

(30) Foreign Application Priority Data

Oct. 10, 2024 (CN) .......................... 202411408358.8

(51) Int. Cl.
  *B60J 7/14* (2006.01)
(52) U.S. Cl.
  CPC ..................................... *B60J 7/141* (2013.01)
(58) Field of Classification Search
  CPC ... B60J 7/141; B60J 7/1607; B60J 7/19; B60J 7/198
  USPC ............. 296/100.02, 100.06, 100.07, 100.09
  See application file for complete search history.

(56) References Cited

U.S. PATENT DOCUMENTS

| | | | |
|---|---|---|---|
| 10,611,218 B2 * | 4/2020 | Cai | B60J 7/106 |
| 10,994,648 B1 * | 5/2021 | Luo | B60P 7/02 |
| 11,021,047 B2 * | 6/2021 | Cai | B60P 7/02 |
| 11,180,010 B1 * | 11/2021 | Xu | B60J 7/0084 |
| 11,890,921 B2 * | 2/2024 | Qiu | B60J 7/198 |
| 2004/0164583 A1 * | 8/2004 | Wheatley | B60J 7/102 296/100.02 |
| 2016/0176448 A1 * | 6/2016 | Germano | B60J 7/141 296/100.09 |
| 2023/0294496 A1 * | 9/2023 | Dylewski, II | B60J 7/141 296/100.07 |

* cited by examiner

*Primary Examiner* — Jason S Daniels
(74) *Attorney, Agent, or Firm* — K&L Gates LLP

(57) ABSTRACT

A vehicle cover panel and frame connection structure are provided. A car cover plate is detachably installed on a rear trunk of a vehicle body. The car cover plate includes a plurality of cover plate frame assemblies connected in series. Each cover plate frame assembly includes a plate material and a plurality of frames arranged around the plate material. One of the frames is connected to an adjacent frame and another adjacent frame is connected to a further adjacent frame, such that the plurality of frames are connected in series to surround a periphery of the plate material. A fixed guide rail clamp connects a guide rail to the rear trunk of the vehicle body. The fixed guide rail clamp includes an outer clamp and an inner clamp fixed by a screw and a nut.

6 Claims, 3 Drawing Sheets

CAR COVER PLATE, FRAME CONNECTION STRUCTURE AND PICKUP TRUCK

CROSS REFERENCES TO RELATED APPLICATIONS

This application is a continuation of U.S. patent application Ser. No. 19/018,071, filed Jan. 13, 2025, entitled "Car Cover Plate, Frame Connection Structure And Pickup Truck," which claims the priority to Chinese Patent Application No. 202411408358.8, filed Oct. 10, 2024, the entireties of which are incorporated herein by reference for all purposes.

BACKGROUND OF THE INVENTION

The present invention relates to the field of automobile parts, in particular to a car cover plate, a frame connection structure.

As a common vehicle type, pickup trucks have the comfort of sedans and are also powerful. Due to their strong capabilities in carrying goods and adapting to poor road conditions, their comprehensive performance has also made them one of the common vehicle types for off-road driving nowadays. In order to enable pickup trucks to adapt to more diverse environments, most existing pickups need to be installed with car covers. The car covers are composed of multiple plates spliced together. Currently, the connection methods between the frames on the market are: no connection or connection using plastic parts. The periphery of the plates is not effectively fixed, resulting in poor structural strength and being prone to risks such as sliding, detachment and bending.

BRIEF SUMMARY OF THE INVENTION

The embodiments of the present invention provide a car cover plate, a frame connection structure to at least solve the technical problems that the structural strength around the plates is poor due to the lack of fixation, and they are prone to sliding, detachment and bending.

To achieve the above objectives, the embodiments of the present invention adopt the following technical solutions:

A car cover plate is detachably installed on the rear trunk of the vehicle body. It is characterized in that the car cover plate is formed by connecting multiple cover plate frame assemblies in series. Each of the cover plate assemblies includes a plate material and multiple frames arranged around it. One of the frames is connected to an adjacent frame through a frame connection structure, and the other frame is also connected to another adjacent frame through a frame connection structure until the multiple frames are connected and fixed in series to surround the periphery of the plate material. The cover plate is connected to the pickup truck body.

Beneficial Effects

In the car cover plate provided by the embodiments of the present invention, since multiple frames are arranged around each plate constituting the car cover plate for reinforcement, the overall structural strength of the car cover plate is greatly enhanced. Due to the improvement of the structural strength, the possibility of the car cover plate bending is significantly reduced, thus prolonging the service life of the car cover plate.

Furthermore, every two adjacent cover plate frame assemblies are connected in series through a connecting piece, with such an arrangement, adjacent cover plate frame assemblies are connected in series through connecting pieces to form the overall car cover plate, and the overall structural strength is improved. The connecting pieces are convenient for installation and disassembly.

Furthermore, a clamping groove is opened in the frame of one of the cover plate frame assemblies, and a clamping groove is also opened in the frame of the other adjacent cover plate frame assembly. The two clamping grooves are connected through a connecting piece. With such an arrangement, the connecting pieces are simultaneously connected to two clamping grooves and are connected together in a clamping manner.

In a possible implementation manner, it also includes guide rails and waterproof rubber strips. The guide rails are installed on the left and right sides of the rear trunk of the vehicle body, and a strip-shaped groove is machined on the inner side wall; the waterproof rubber strips are installed between the guide rails and the rear trunk of the vehicle body; the guide rails are connected to the rear trunk of the vehicle body through fixed guide rail clamps. Due to the setting of the fixed guide rail clamps, the installation and disassembly between the car cover plate and the rear trunk of the vehicle body are facilitated.

Furthermore, the fixed guide rail clamp includes an outer clamp and an inner clamp, the outer clamp and the inner clamp are arranged oppositely, and the tension between the outer clamp and the inner clamp is adjusted through the cooperation of screws and nuts.

Furthermore, the outer clamp includes a body, a clamping plate, a guide cylinder and a limiting area, a body, which is in a vertical shape, and a first through hole is opened at the center; a clamping plate, located at the top end of the side of the body close to the inner clamp, and a toothed surface is machined; a guide cylinder, located at the bottom end of the side of the body close to the inner clamp, and a part of it is open; a limiting area, located at the center position of the side of the body away from the inner clamp, corresponding to the position of the first through hole, and the limiting area is surrounded by two parallel horizontal plates;

The inner clamp includes a base body, a slider and a guide post, a base body, which is in a vertical shape, and a second through hole is opened at the center; a slider, located at the top end of the side of the base body close to the outer clamp, and is smoothly connected to the strip-shaped groove; a guide post, located at the bottom end of the side of the base body close to the outer clamp, and is plugged into the guide cylinder.

Furthermore, the nut is located in the limiting area, and the tip of the screw passes through the second through hole and the first through hole in turn and is spirally connected to the nut.

On the other hand, the embodiments of the present invention also provide a frame connection structure for connecting the frames on the peripheral side of the plates to each other, including: a groove is opened at the abutting position of each frame and the peripheral side of the plate material, and the peripheral side of the plate material is embedded in the recess of the groove to surround the peripheral side of the plate material; a fixing part and a limiting part are respectively set at the connection of two adjacent frames. The fixing part is located in one of the frames, and the limiting part is located in the adjacent other frame. The limiting part through a fastener is connected to the fixing part, fixing the two adjacent frames on the peripheral side of the plate material.

Beneficial Effects

In the frame connection structure provided by the components of the present invention, since the grooves of the frames surround the peripheral side of the plates, the contact area between the frames and the plates is larger, and the connection is more closely connected The fixed part and the limiting part at the connection are fixed together by fasteners, making the connection between adjacent frames more stable, avoiding relative sliding, preventing detachment and separation, and improving the stability and safety during the use process.

Furthermore, the fastener includes a part to be fixed and a part to be limited; in the limiting part a second passing part is opened, at the position where the second passage extends in the direction away from the limiting part, a first passage is opened, the first passing part is in communication with the second passing part and is located on the same straight line; among them, the part to be fixed passes through the first passing part and the second passing part in turn and is connected to the fixing part, and the part to be limited abuts against the limiting part, with such an arrangement, the stability of the connection between adjacent frames is improved.

Furthermore, a notch is opened at the end of one of the frames, and an abutting part is set at the end of the adjacent other frame. The abutting part matches the notch and abuts together, through the cooperation of the abutting part and the notch, the two adjacent frames are cross-connected with each other, avoiding relative sliding.

Figure 1:
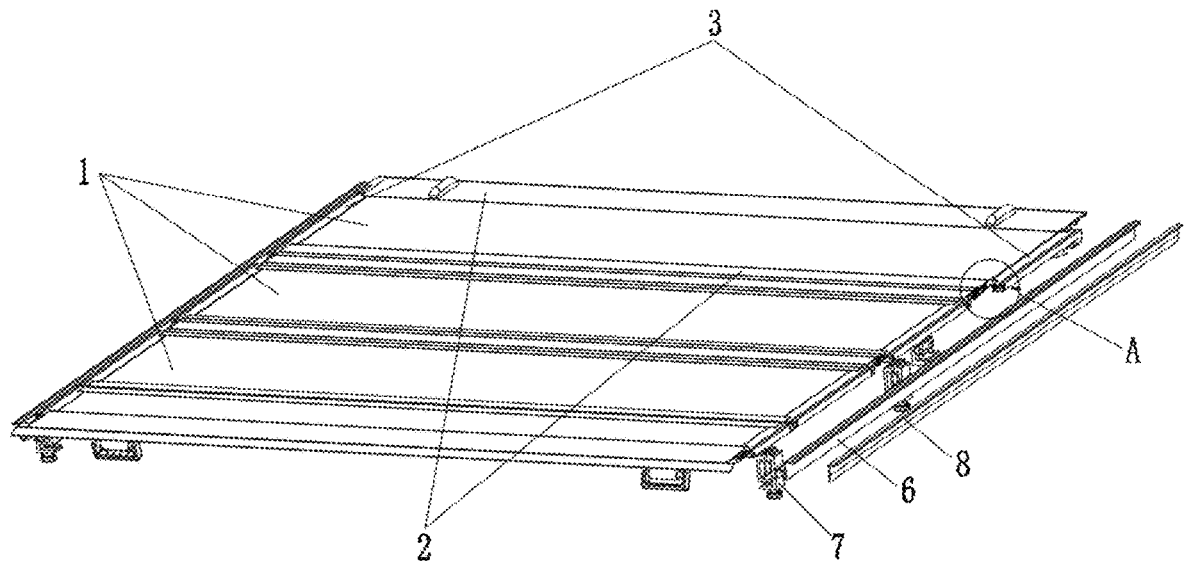
FIG. 1 is the assembly drawing of the car cover plate in the embodiment of the present invention.

1. Plate material, 2. First frame, 21. First groove, 22. Abutting part, 23. Fixing part, 24. Clamping groove, 3. Second frame, 31. Second groove, 32. Notch, 33. First passing part, 34. Limiting part, 35. Second passing part, 4. Connecting piece, 41. Clamping strip, 5. Fastener, 51. Part to be fixed, 52. Part to be limited, 6. Guide rail, 61. Strip-shaped groove, 7. Fixed guide rail clamp, 71. Outer clamp, 711. Body, 712. Clamping plate, 713. Toothed surface, 714. Guide cylinder, 715. First through hole, 716. Limiting area, 72. Inner clamp, 721. Base body, 722. Slider, 723. Guide post, 724. Second through hole, 8. Waterproof rubber strip, 9. Screw, 10. Nut.

DETAILED DESCRIPTION OF THE INVENTION

The following describes the embodiments of the present invention in detail with reference to the attached drawings.

In the description of the present invention, it should be understood that the terms such as "center", "upper", "lower", "front", "back", "left", "right", "vertical", "horizontal", "top", "bottom", "inner", "outer", etc. indicating the orientation or positional relationship are based on the orientation or positional relationship shown in the attached drawings, which are only for the convenience of describing the present invention and simplifying the description, rather than indicating or implying that the referred device or element must have a specific orientation, be constructed and operated in a specific orientation, and thus should not be construed as a limitation to the present invention.

The terms "first" and "second" are only used for descriptive purposes and cannot be construed as indicating or implying relative importance or implicitly indicating the number of the indicated technical features. Thus, the features defined with "first" and "second" may explicitly or implicitly include one or more of such features. In the description of the present invention, unless otherwise specified, the meaning of "multiple" is two or more.

In the description of the present invention, it should be noted that, unless otherwise clearly stipulated and limited, the terms "installation", "connected", "connection" should be broadly understood. For example, it can be a fixed connection, a detachable connection, or an integral connection; it can be a mechanical connection or an electrical connection; it can be a direct connection or an indirect connection through an intermediate medium, and it can also be the internal communication of two elements. For those of ordinary skill in the art, they can understand the specific meanings of the above terms in the present invention according to specific situations.

The embodiment of the present invention discloses a car cover plate, which is detachably installed on the rear trunk of the vehicle body. Please refer to FIG. 1. the car cover plate is formed by connecting multiple cover plate frame assemblies in series. Each of the cover plate assemblies includes a plate material 1 and multiple frames arranged around it. One of the frames is connected to an adjacent frame through a frame connection structure, and the other frame is also connected to another adjacent frame through a frame connection structure until the multiple frames are connected and fixed in series to surround the periphery of the plate material 1. The cover plate is connected to the pickup truck body.

In the car cover plate provided by the embodiment of the present invention, since multiple frames are arranged around each plate material 1 constituting the car cover plate for reinforcement, the overall structural strength of the car cover plate is greatly enhanced. Due to the improvement of the structural strength, the possibility of the car cover plate bending is significantly reduced, thus prolonging the service life of the car cover plate.

In order to connect multiple cover plate frame assemblies in series, please continue to refer to FIG. 1. Every two adjacent cover plate frame assemblies are connected in series through a connecting piece. By connecting every adjacent cover plate frame assemblies in series through the connecting piece to form the overall car cover plate, the overall structural strength is improved, and the connecting piece is convenient for installation and disassembly.

The following gives a specific example to illustrate the above-mentioned serial connection method. Please refer to FIG. 2. a clamping groove 24 is opened in the frame of one of the cover plate frame assemblies, and a clamping groove 24 is also opened in the frame of the other adjacent cover plate frame assembly. The two clamping grooves 24 are connected through a connecting piece 4, with such an arrangement, the connecting piece is simultaneously connected to two clamping grooves 24 and is connected together in a clamping manner. Specifically, the connecting piece is in a long strip shape and has two branched clamping strips 41, and the two clamping strips 41 are respectively clamped with the clamping grooves 24.

Figure 3:
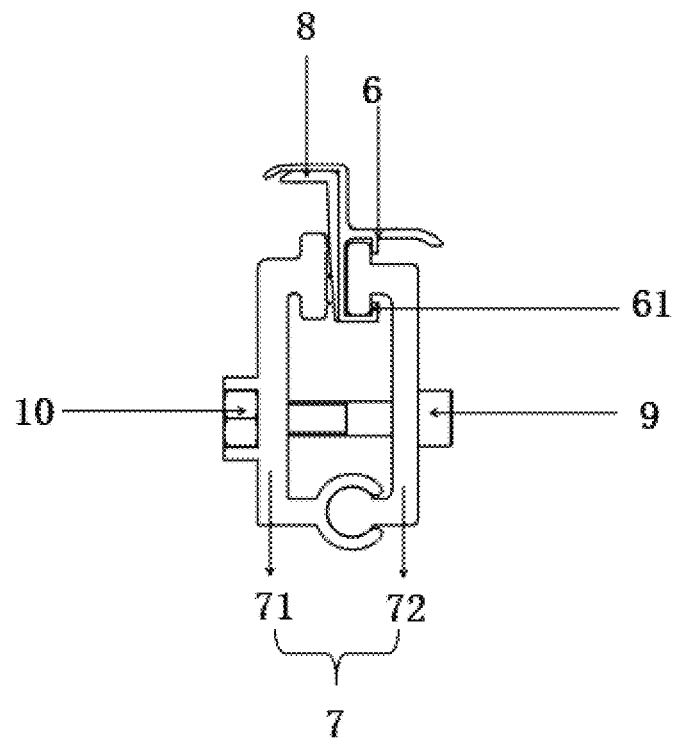
FIG. 3 is the assembly drawing of the fixed guide rail clamp and the side rail in the embodiment of the present invention.

In order to facilitate the installation and disassembly between the car cover plate and the pickup truck body, please refer to FIG. 3. It also includes that a guide rail 6, the guide rail 6 is installed on the left and right sides of the rear trunk of the vehicle body, and a strip-shaped groove 61 is machined on the inner side wall; a waterproof rubber strip 8, installed between the guide rail 6 and the rear trunk of the vehicle body, the guide rail 6 is connected to the rear trunk of the vehicle body through the fixed guide rail clamp 7. Due to the setting of the fixed guide rail clamp 7, the installation and disassembly between the car cover plate and the rear trunk of the vehicle body are facilitated.

The following gives a specific example to illustrate the above-mentioned fixed guide rail clamp 7. Please continue to refer to FIG. 3. The fixed guide rail clamp 7 includes: the outer clamp 71 and the inner clamp 72 are arranged oppositely, and the tension between the outer clamp 71 and the inner clamp 72 is adjusted through the cooperation of screws and nuts.

Figure 4:
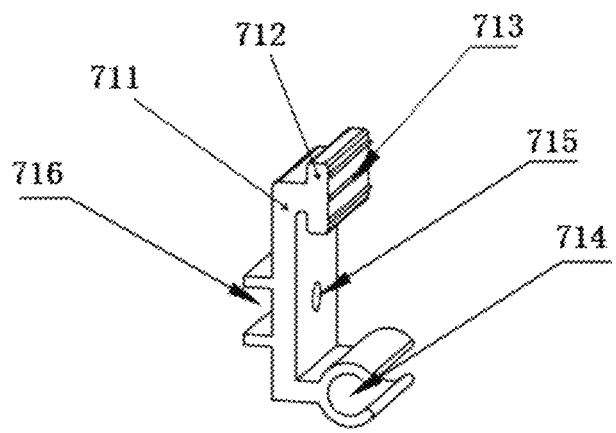
FIG. 4 is the three-dimensional view of the outer clamp in the embodiment of the present invention.
Figure 5:
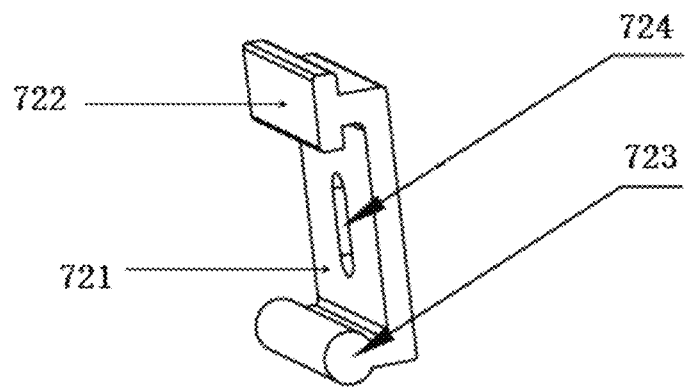
FIG. 5 is the three-dimensional view of the inner clamp in the embodiment of the present invention.

The following gives a specific example to illustrate the above-mentioned outer clamp 71. Please refer to FIG. 4. The outer clamp 71 includes a body 711, a clamping plate 712, a guide cylinder 714, and a limiting area 716, a body 711, which is in a vertical shape, and a first through hole 715 is opened at the center; a clamping plate 712, located at the top end of the side of the body 711 close to the inner clamp 72, and a toothed surface 713 is machined; a guide cylinder 714, located at the bottom end of the side of the body 711 close to the inner clamp 72, and a part of it is open; a limiting area 716, located at the center position of the side of the body 711 away from the inner clamp 72, corresponding to the position of the first through hole 715, and the limiting area 716 is surrounded by two parallel horizontal plates;

The following gives a specific example to illustrate the above-mentioned inner clamp 72. Please refer to FIG. 5. The inner clamp 72 includes a base body 71, a slider 722, and a guide post 723, a base body 721, which is in a vertical shape, and a second through hole 724 is opened at the center; a slider 722, located at the top end of the side of the base body 721 close to the outer clamp 71, and is smoothly connected to the strip-shaped groove 61; a guide post 723, located at the bottom end of the side of the base body 721 close to the outer clamp 71, and is plugged into the guide cylinder 714.

In order to fix the outer clamp 71 and the inner clamp 72, please continue to refer to FIG. 3, the nut 10 is located in the limiting area 716, and the tip of the screw 9 passes through the second through hole 724 and the first through hole 715 in turn and is spirally connected to the nut 10.

On the other hand, the embodiment of the present invention also provides a frame connection structure for connecting the frames on the peripheral side of the plate material 1 to each other. A groove is opened at the abutting position of each frame and the peripheral side of the plate material 1, and the peripheral side of the plate material 1 is embedded in the recess of the groove to surround the peripheral side of the plate material 1; a fixing part 23 and a limiting part 34 are respectively set at the connection of two adjacent frames. The fixing part 23 is located in one of the frames, and the limiting part 34 is located in the adjacent other frame. The limiting part 34 through a fastener 5 is connected to the fixing part 23, fixing the two adjacent frames on the peripheral side of the plate material 1. Specifically, for two adjacent frames, one is the first frame 2, and a first groove 21 is opened at the abutting position of the first frame 2 and the peripheral side of the plate material 1. The other is the second frame 3, and a second groove 31 is opened at the abutting position of the second frame 3 and the peripheral side of the plate material 1. The fastener 5 is a bolt, the fixing part 23 is a part with threads that is fixed by meshing with the bolt, and the limiting part 34 is the inner wall of the second frame 3 close to the fixing part 23. A part of the fastener 5 passes through the inner wall of the second frame 3 and is fixedly connected to the fixing part 23.

The embodiment of the present invention provides a frame connection structure. Since the grooves of the frames surround the peripheral side of the plate material 1, the contact area between the frames and the plate material 1 is larger and the connection is more g w. By fixing the fixing part 23 and the limiting part 34 at the connection through the fastener 5, the connection between adjacent frames is more stable, avoiding relative sliding, preventing detachment and separation, and improving the stability and safety during the use process.

Figure 2:
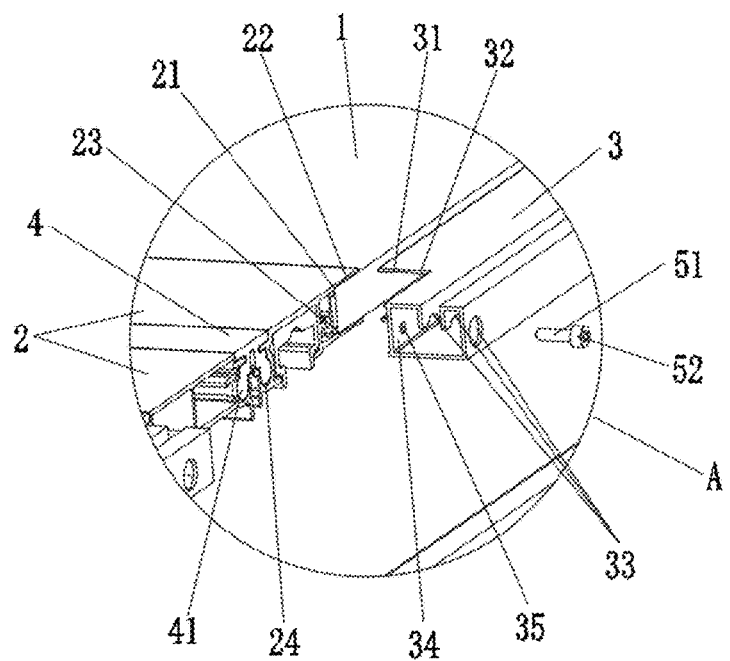
FIG. 2 is the enlarged view of the part A in FIG. 1.

In order to achieve a stable connection between the frames, please continue to refer to FIG. 2, In the limiting part 34 a second passing part 35 is opened, at the position where the second passage 35 extends in the direction away from the limiting part 34, a first passage 33 is opened, the first passing part 33 is in communication with the second passing part 35 and is located on the same straight line; among them, the part to be fixed 51 passes through the first passing part and the second passing part in turn and is connected to the fixing part 23, and the part to be limited 52 abuts against the limiting part 34, with such an arrangement, the stability of the connection between adjacent frames is improved. Specifically, the two adjacent frames are the first frame 2 and the second frame 3 respectively. The limiting part 34 is the inner side wall of the second frame 3. The position where the second passing part 35 extends in the direction away from the limiting part 34 is the middle wall and the outer side wall of the second frame 3. The first passing part 33 is opened on the middle wall and the outer side wall of the second frame 3 respectively. The second passing part 35 is opened on the inner side wall of the second frame 3. The part to be fixed 51 passes through the first passing part 33 and the second passing part 35 in turn and is connected to the fixing part 23. The part to be limited 52 passes through the first passing part 33 and abuts against the inner wall of the second frame 3.

In order to avoid the relative positional deviation between the two frames, a notch 32 is opened at the end of one of the frames, and an abutting part 22 is set at the end of the adjacent other frame. The abutting part 22 matches the notch 32 and abuts together, through the cooperation of the abutting part 22 and the notch 32, the two adjacent frames are cross-connected with each other, avoiding relative sliding. Specifically, a rectangular abutting part 22 is set at the corner of the first frame 2, and a notch 32 is opened at the position opposite to the abutting part on the second frame 3. The abutting part 22 abuts against the notch 32, and they perform relative limitation on each other, avoiding relative sliding.

In the description of this specification, specific features, structures, materials, or characteristics can be combined in any one or more embodiments or examples in an appropriate manner.

The above is only the specific implementation mode of the present invention, but the protection scope of the present invention is not limited thereto. Any person skilled in the technical field can easily think of changes or replacements within the technical scope disclosed by the present invention, and they should all be covered within the protection scope of the present invention. Therefore, the protection scope of the present invention should be based on the protection scope of the claimed rights.

What is claimed is:

1. A car cover plate detachably installed on a rear trunk of a vehicle body, comprising:
a plurality of cover plate frame assemblies connected in series, each cover plate frame assembly including:
a plate material (1);
a plurality of frames arranged around the plate material (1), wherein:
one of the frames is connected to an adjacent frame, and another adjacent frame is connected to a further adjacent frame, such that the plurality of frames are connected in series to surround a periphery of the plate material (1);
a fixed guide rail clamp (7) connecting a guide rail (6) to the rear trunk of the vehicle body,
wherein the fixed guide rail clamp (7) comprises:
an outer clamp (71) and an inner clamp (72) fixed by a screw (9) and a nut (10),
wherein the nut (10) is located in a limiting area (716) of the outer clamp (71), and a tip of the screw (9) sequentially passes through a second through hole (724) of the inner clamp (72) and a first through hole (715) of the outer clamp (71), and is spirally connected to the nut (10),
wherein the guide rail (6) is installed on left and right sides of the rear trunk of the vehicle body, wherein an inner side wall of the guide rail (6) includes a strip-shaped groove (61), and
a waterproof rubber strip (8) disposed between the guide rail (6) and the rear trunk of the vehicle body,
wherein the outer clamp (71) comprises:
a vertical body (711) with the first through hole (715) at a center thereof;
a clamping plate (712) at a top end of the vertical body (711) adjacent to the inner clamp (72), the clamping plate (712) having a toothed surface (713);
a guide cylinder (714) at a bottom end of the body (711) adjacent to the inner clamp (72), the guide cylinder (714) being partially open;
wherein the limiting area (716) is formed at a center of a side of the vertical body (711) opposite to the inner clamp (72), the limiting area (716) being surrounded by two parallel horizontal plates;
wherein the inner clamp (72) comprises:
a vertical base body (721) with the second through hole (724) at a center thereof;
a slider (722) at a top end of the vertical base body (721) adjacent to the outer clamp (71), the slider (722) being slidably engaged with the strip-shaped groove (61); and
a guide post (723) at a bottom end of the vertical base body (721) adjacent to the outer clamp (71), the guide post (723) being inserted into the guide cylinder (714).

2. The car cover plate according to claim 1, wherein every two adjacent cover plate frame assemblies are connected through a connecting piece (4).

3. The car cover plate according to claim 2, wherein:
a first clamping groove (24) is formed in a frame of a first cover plate frame assembly of the plurality of cover plate frame assemblies,
a second clamping groove (24) is formed in a frame of an adjacent second cover plate frame assembly of the plurality of cover plate frame assemblies, and
the first and second clamping grooves (24) are connected via the connecting piece (4).

4. The car cover plate according to claim 1, wherein the outer clamp (71) and the inner clamp (72) are oppositely arranged, and tension between the outer clamp (71) and the inner clamp (72) is adjusted by the screw (9) and the nut (10).

5. A frame connection structure for connecting a plurality of frames disposed on a peripheral side of a plate material (1), comprising:
a groove formed at an abutting position where each frame contacts the peripheral side of the plate material (1), wherein the peripheral side of the plate material (1) is embedded into the groove to circumferentially enclose the peripheral side of the plate material (1);
a fixing member (23) disposed within a first frame of two adjacent frames, and a limiting member (34) disposed within a second frame adjacent to the first frame;
wherein the limiting member (34) is operably connected to the fixing member (23) via a fastener (5), thereby securing the two adjacent frames on the peripheral side of the plate material (1);
wherein the fastener (5) comprises a fixed portion (51) and a limited portion (52);
the limiting member (34) defines a second passage (35) extending therethrough, and a first passage (33) communicating with and aligned linearly with the second passage (35), the first passage (33) being formed in a direction extending away from the limiting member (34);
wherein the fixed portion (51) sequentially passes through the first passage (33) and the second passage (35) to engage with the fixing member (23), and the limited portion (52) abuts against a surface of the limiting member (34).

6. The frame connection structure according to claim 5, wherein:
a notch (32) is formed at an end of the first frame, and a complementary notch (32) is formed at an end of the second frame;
wherein the notch (32) of the first frame and the complementary notch (32) of the second frame cooperatively define an alignment cavity when the two adjacent frames are connected.

* * * * *